J. R. Harrington.
Carpet Lining.
No. 2,415. Reissued Dec. 11, 1866.
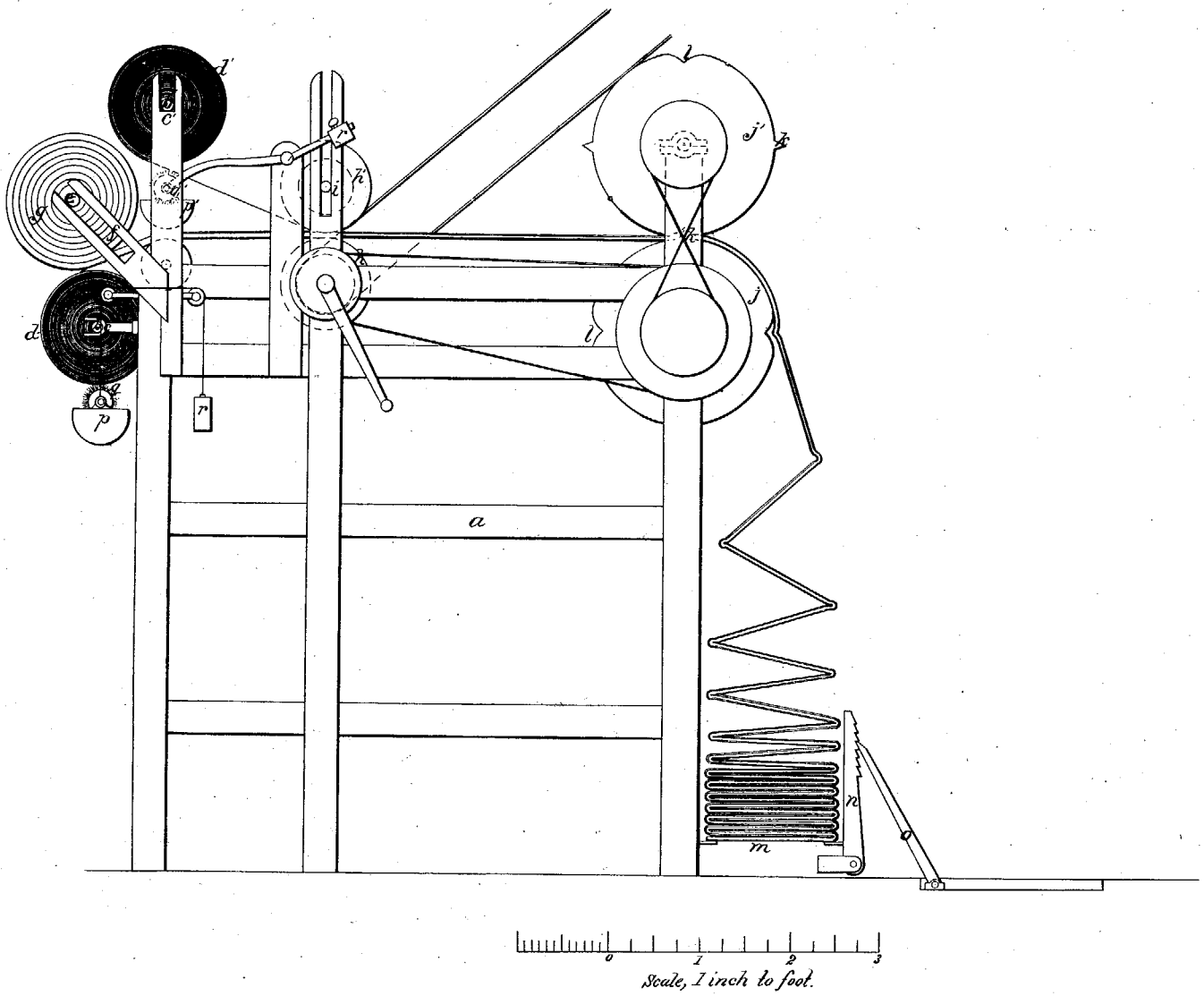
N. PETERS, PHOTO-LITHOGRAPHER, WASHINGTON, D. C.

UNITED STATES PATENT OFFICE.

GEORGE W. CHIPMAN, OF BOSTON, MASSACHUSETTS, ASSIGNEE, BY MESNE ASSIGNMENTS, OF JOHN R. HARRINGTON.

IMPROVED CARPET-LINING.

Specification forming part of Letters Patent No. 14,585, dated April 1, 1856; Reissue No. 2,415, dated December 11, 1866.

*To all whom it may concern:*

Be it known that J. R. HARRINGTON, of Dayton, Montgomery county, Ohio, has invented an Improved Manufacture of Carpet-Lining, of which the following, taken in connection with the drawings which accompany and form part of this specification, is a description sufficient to enable those skilled in the art to practice it.

The invention relates to a new manufacture of carpet-lining; and consists in a carpet-lining (as a new article of manufacture) made of a continuous flock, batting, or wadding of soft elastic fibrous material, having one or both of its surfaces protected by a continuous sheet or sheets of stout paper, to which the batting or wadding is so confined as to prevent its displacement.

This lining is preferably made in a machine, in which the two long sheets of paper, wound upon rolls, are drawn from such rolls by and between presser and feed rolls, which, in feeding the paper, draws in between the sheets, and so as to be fed uniformly with the paper, the continuous sheet of batting, the sides of the paper which are to lie against the wadding being coated with adhesive material as they pass from their respective rolls, so that by pressure against the batting-surface they will adhere thereto, or the pressure of the paper against the batting between the feed-rolls causing an interlocking of the fibers of the batting to prevent displacement of the batting.

Other means may be used for securing the soft fibrous material and paper together, but these are considered the most desirable.

The lining so made is found to possess in a remarkable degree the advantages of uniform and even substance and surface, permanent elasticity, non-conduction of cold, heat, and sound, easy appliance and removal, preservation of the carpet beneath which it is spread, and a merchantable form.

The drawing represents a side elevation of a machine which may be used in this manufacture, and shows in red lines the carpet-lining made up of the sheets of paper, having a layer of soft elastic fibrous material between them.

*a* denotes the frame; *b b'*, horizontal cross-rolls, hung at different elevations in bearings *c c'*. Around each roll *b b'* is wound a roll of stout paper, *d d'*. *e* denotes a horizontal roll, resting in oblique slots *f*, so as to revolve at an elevation intermediate between the rolls *b b'*. Around this roll *e* is wound a fibrous bat or lap, *g*. The obliquely-slotted bearing of the roll *e* enables its advance as the lap in the course of operation of the feed-rolls becomes unwound, the parts being so arranged as to enable the roll of wadding to rest at all times upon the lower roll of paper, and to be supported by and drawn onward with such paper. *h h'* are two feed and presser rollers, the upper one of which occupies vertical slotted bearings *i* in the frame, and rests upon the upper surface of the paper. To the shaft of the roller *h* is applied a winch or driving-pulley, by which the machine is set in motion. *j j'* are two rollers, placed somewhat in advance of and with their parts most nearly in contact, about on a level with corresponding parts of the rollers *h h'*.

These rollers are identical in form, having each of them two opposite ridges, *k*, and grooves *l*, as represented, the ridges of one roller meshing into the grooves of the other.

The circumference of each roller, including the indentations and projections, may measure just two yards, so as to measure precisely half a yard from each projection to the next indentation on the same roller.

These rollers, called "creasing-rollers," in connection with a platform or box placed some distance immediately under the delivery of the said rollers, serve to deposit the material in uniform folds of uniform width without any further manipulation, being thus accurately measured off and conveniently folded for baling.

This peculiar mode of folding becomes advisable from the nature of the material, for the paper inclosures not being of a nature susceptible of stretching, a continuous folding of the material in one direction, besides preventing the possibility of the above-described method of measurement by folds, would result in an injurious wrinkling of one of the paper layers, that would interfere with the smooth disposal of the lining upon a floor.

*m* is a platform, which receives the lining from the creasing-rollers. *n* is a temporary front, which, being held up by a pawl, *o*, during the folding of the stuff, can be let down to permit the removal of the piece for baling. The two creasing-rollers are geared together in such way as to insure their equal action and rotation. *p p'* are paste or cement-containing troughs, in which are hung cylindrical rotary brushes *q q'*. These brushes are, by means of counter-balances *r*, made to press and revolve against the inner surfaces of the paper, applying thereto the cement, which causes the outer surfaces of the filling and the inner surfaces of the paper to adhere as they are pressed together.

When the machine is intended to manufacture a lining or wadding without causing the intermediate layer of cotton or other filling to adhere to the outside sheets of paper by means of cement, the fiber of the cotton being made to adhere to the rough or nappy surface of the paper by pressure as they are passed through the rolls *h h'*, then the cementing apparatus may be dispensed with.

Rolls of paper and wadding being placed on their respective bearings, as described, and the troughs being properly supplied with adhesive fluid, the ends of the paper, with the wadding between them, are introduced between the presser-rollers, whence, passing onward, they are carried between the creasing-rollers, and thence descend in proper folds, as before explained, onto the platform.

When a desirable number of folds has accumulated upon the platform, the piece is separated at the proper crease, and may then be removed and baled, to make room for the next.

What is claimed is—

As a new article of manufacture, a carpet-lining made up of a long or continuous sheet or sheets of stout paper, and a layer or layers of fibrous material applied thereto, substantially as set forth.

GEO. W. CHIPMAN.

Witnesses:
F. GOULD,
L. H. LATIMER.